(12) United States Patent
Beadle et al.

(10) Patent No.: US 7,167,901 B1
(45) Date of Patent: Jan. 23, 2007

(54) METHOD AND APPARATUS FOR IMPROVED BOOKMARK AND HISTORIES ENTRY CREATION AND ACCESS

(75) Inventors: Bruce A. Beadle, Round Rock, TX (US); Randolph Michael Florenza, Austin, TX (US); Miguel Sang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 09/697,428

(22) Filed: Oct. 26, 2000

(51) Int. Cl.
*G06F 15/16* (2006.01)
*G06F 7/00* (2006.01)
(52) U.S. Cl. .......................... 709/207; 709/217; 707/3
(58) Field of Classification Search ............... 707/3, 707/4, 5, 6, 10, 104, 101, 102; 709/245, 709/217, 219, 203; 715/513, 501.1, 500
See application file for complete search history.

(56) References Cited

U.S. PATENT DOCUMENTS

| | | | | |
|---|---|---|---|---|
| 4,754,326 A | * | 6/1988 | Kram et al. | 707/1 |
| 4,970,678 A | | 11/1990 | Sladowski et al. | |
| 5,050,071 A | * | 9/1991 | Harris et al. | 707/1 |
| 5,813,007 A | * | 9/1998 | Nielsen | 707/10 |
| 5,848,410 A | * | 12/1998 | Walls et al. | 707/4 |
| 5,895,471 A | | 4/1999 | King et al. | |
| 5,902,353 A | | 5/1999 | Reber et al. | |
| 5,963,964 A | | 10/1999 | Nielsen | |
| 5,978,828 A | * | 11/1999 | Greer et al. | 709/224 |
| 6,067,565 A | * | 5/2000 | Horvitz | 709/218 |
| 6,078,913 A | * | 6/2000 | Aoki et al. | 707/2 |
| 6,078,924 A | * | 6/2000 | Ainsbury et al. | 707/101 |
| 6,088,707 A | * | 7/2000 | Bates et al. | 715/501.1 |
| 6,100,890 A | * | 8/2000 | Bates et al. | 345/826 |

(Continued)

FOREIGN PATENT DOCUMENTS

EP  000833258 A2 * 1/1998

(Continued)

OTHER PUBLICATIONS

Keller et al. "A Bookmarking Service for Organizing and Sharing URLs", Computer Networks and ISDN Systems. vol. 29, Sep. 1997.*

(Continued)

*Primary Examiner*—Paul H. Kang
(74) *Attorney, Agent, or Firm*—Marilyn Smith Dawkins; Dillon & Yudell LLP

(57) ABSTRACT

Each entry within a "hotlist" (bookmark, favorites, or history list) includes a set of keywords topically identifying the content of the linked page. The keywords included within META tags for HTML files of an accessed Web page may be automatically detected and extracted by the browser for the hotlist when the browser creates the entry for that page within the hotlist. Alternatively, the browser may tabulate terms from the page content itself to select keywords identifying the content. In either case, the user may selectively edit the keywords for a hotlist entry to add, modify, or delete keywords. The keywords are stored with the hotlist data and may be searched for a particular topic. Hotlist entries matching the search criteria are displayed to the user and, upon selection of a particular matching entry by the user, employed to automatically generate a request for the corresponding page.

12 Claims, 6 Drawing Sheets

U.S. PATENT DOCUMENTS

| | | | |
|---|---|---|---|
| 6,208,995 B1 * | 3/2001 | Himmel et al. | 707/10 |
| 6,212,522 B1 * | 4/2001 | Himmel et al. | 707/10 |
| 6,275,862 B1 * | 8/2001 | Sharma et al. | 709/245 |
| 6,295,559 B1 * | 9/2001 | Emens et al. | 707/10 |
| 6,393,427 B1 * | 5/2002 | Vu et al. | 707/101 |
| 6,460,060 B1 * | 10/2002 | Maddalozzo et al. | 715/513 |
| 6,533,822 B1 * | 3/2003 | Kupiec | 715/530 |
| 6,574,625 B1 * | 6/2003 | Bates et al. | 707/10 |
| 6,584,498 B1 * | 6/2003 | Nguyen | 709/219 |
| 6,628,314 B1 * | 9/2003 | Hoyle | 715/854 |
| 6,631,496 B1 * | 10/2003 | Li et al. | 715/501.1 |
| 6,792,430 B1 * | 9/2004 | Kenyon et al. | 707/102 |
| 6,820,237 B1 * | 11/2004 | Abu-Hakima et al. | 715/531 |
| 6,832,350 B1 * | 12/2004 | Bates et al. | 715/501.1 |
| 2002/0010719 A1 * | 1/2002 | Kupiec | 707/526 |
| 2002/0040311 A1 * | 4/2002 | Douglass et al. | |
| 2002/0052898 A1 * | 5/2002 | Schilit et al. | 707/530 |

FOREIGN PATENT DOCUMENTS

| | | |
|---|---|---|
| EP | 0 889 423 A1 | 1/1999 |
| EP | 0 921 481 A2 | 6/1999 |
| EP | 0 944 009 A2 | 9/1999 |

OTHER PUBLICATIONS

Maarek, Y. et al.; "Automatically Organizing Bookmarks per Contents", Fifth International WWW Conference; May 1996.*

Keller, R. et al.; "A Bookmarking Service for Organizing and Sharing URLs", Sixth International WWW Conference; Paper 189, TEC 117; Apr. 1997.*

Marias, H. et al.; "Supporting cooperative and personal surfing with a desktop assisstant", Tenth Annual ACM Symposium on User Interface software and technology; ISBN 0897918819; 1997.*

"Internet Placemarks for Uniform Resource Locator Bookmark Operations," IBM Technical Disclosure Bulletin, vol. 41, No. 01, Jan. 1998, IBM Corp. 1998.

"Organizing Bookmarks at the Time of Creation," Research Disclosure, Apr. 1998/495, Disclosed by International Business Machines Corporation, 408180.

"Displaying User Information as Streams with Kinks," Research Disclosure, Jun. 1998/821, Disclosed by International Business Machines Corporation 410135.

* cited by examiner

| Name | URL | Add Date | Last Visited | Description | Keyword(s) |
|---|---|---|---|---|---|
| 202 | 204 | 206 | 208 | 210 | 122 |

| Name | URL | First Visited | Last Visited | Expiration | Keyword(s) |
|---|---|---|---|---|---|
| 212 | 214 | 216 | 218 | 220 | 124 |

METHOD AND APPARATUS FOR IMPROVED BOOKMARK AND HISTORIES ENTRY CREATION AND ACCESS

BACKGROUND OF THE INVENTION

1. Technical Field

The present invention relates generally to organizing and accessing entries in a web page list and in particular to organizing a web page list to easily locate and retrieve relevant pages based on content. Still more particularly, the present invention relates to employing keywords and search terms in connection with a web page list to facilitate location and retrieval of relevant pages based on content.

2. Description of the Related Art

Almost all hypertext systems, including web browsers, provide a facility listing particular sites on the Internet for quick, easy access. Such a facility is normally referred to as a bookmark or "favorites" list, a history list, a hotlist, or "channels." These lists are typically displayed within a browser or other communications management utility (such as Windows™ Explorer) as a textual list of titles which may be selected in "point-and-click" fashion by the user. Often a user may add new entries to the list, alter the title or Uniform Resource Locator (URL) associated with a list entry, reorder entries, or delete one or more entries from the list. Some lists simply identify, on a rolling basis, a specified number of the last sites which a user visited using the browser.

Several organizational problems attend these lists as they are currently implemented and employed. First, by nature these lists offer minimal insight into the content represented by an entry. The problem is analogous to locating a desired book or volume within a library. To locate a particular volume in a library with only ten books is usually easy. Even if the cover or table of contents of each of the ten volumes must be inspected to determine the content, this takes only a few minutes, at most. Locating the same volume within a library of 300,000 books, however, can be much more difficult and time consuming.

Furthermore, lists of this type continually expand as the user's web browsing continues, quickly growing past a generally manageable size. Users often accumulate hundreds of bookmarks in their bookmark lists, while history lists can expand to thousands of entries depending on browser settings. Although the linear nature of such lists demands organization to efficiently locate relevant entries, no automated mechanism for organizing these lists exists. Users typically do not spend the time required to organize their bookmark lists, and history list organization is constrained by whichever sorting mechanisms are supported by the browser (e.g., by URL, name, first visited, last visited, etc.). Even if organized, however, the organization may not provide sufficient information to enable selection of the appropriate site based upon content.

The problem is further complicated when a group of users shares a common set of bookmarks, such as when one user sends a bookmark file to another or when multiple users employ the same machine with a common or standard bookmark and history configuration. In either case, the user wishing to locate particular content from the list(s) may find the proper bookmark or history entry only by manually searching recursively through folders of shared bookmarks, and in some cases actually retrieving the associated web pages to ascertain the content.

The problem, as illustrated by the library analogy above, revolves around scale, but is also compounded by the fact that categorized bookmark or history entries may fit into more than one designated category. While "folders" within such lists are designed to provide a useful classification system for the entries, the categorization for a bookmark or history entry which best identifies the linked content may change over time and may not be intuitive across all users.

It would be desirable, therefore, to provide a mechanism allowing the user to efficiently and automatically locate hotlist entries related to a topic of interest, without requiring substantial organizational overhead. It would further be advantageous for the mechanism to automatically index a site to facilitate location of desired content when each bookmark or history entry is created.

SUMMARY OF THE INVENTION

It is therefore one object of the present invention to improve organization of and access to entries in a web page list.

It is another object of the present invention to organize a web page list for easy location and retrieval of relevant pages based on content.

It is yet another object of the present invention to employ keywords and search terms in connection with a web page list to facilitate location and retrieval of relevant pages based on content.

The foregoing objects are achieved as is now described. Each entry within a "hotlist" (bookmark, favorites, or history list) includes a set of keywords topically identifying the content of the linked page. The keywords included within META tags for HTML files of an accessed Web page may be automatically detected and extracted by the browser for the hotlist when the browser creates the entry for that page within the hotlist. Alternatively, the browser may tabulate terms from the page content itself to select keywords identifying the content. In either case, the user may selectively edit the keywords for a hotlist entry to add, modify, or delete keywords. The keywords are stored with the hotlist data and may be searched for a particular topic. Hotlist entries matching the search criteria are displayed to the user and, upon selection of a particular matching entry by the user, employed to automatically generate a request for the corresponding page.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2A–2B are data structures for bookmarks and history lists in accordance with a preferred embodiment of the present invention;

DETAILED DESCRIPTION OF THE PREFERRED EMBODIMENT

Figure 1:
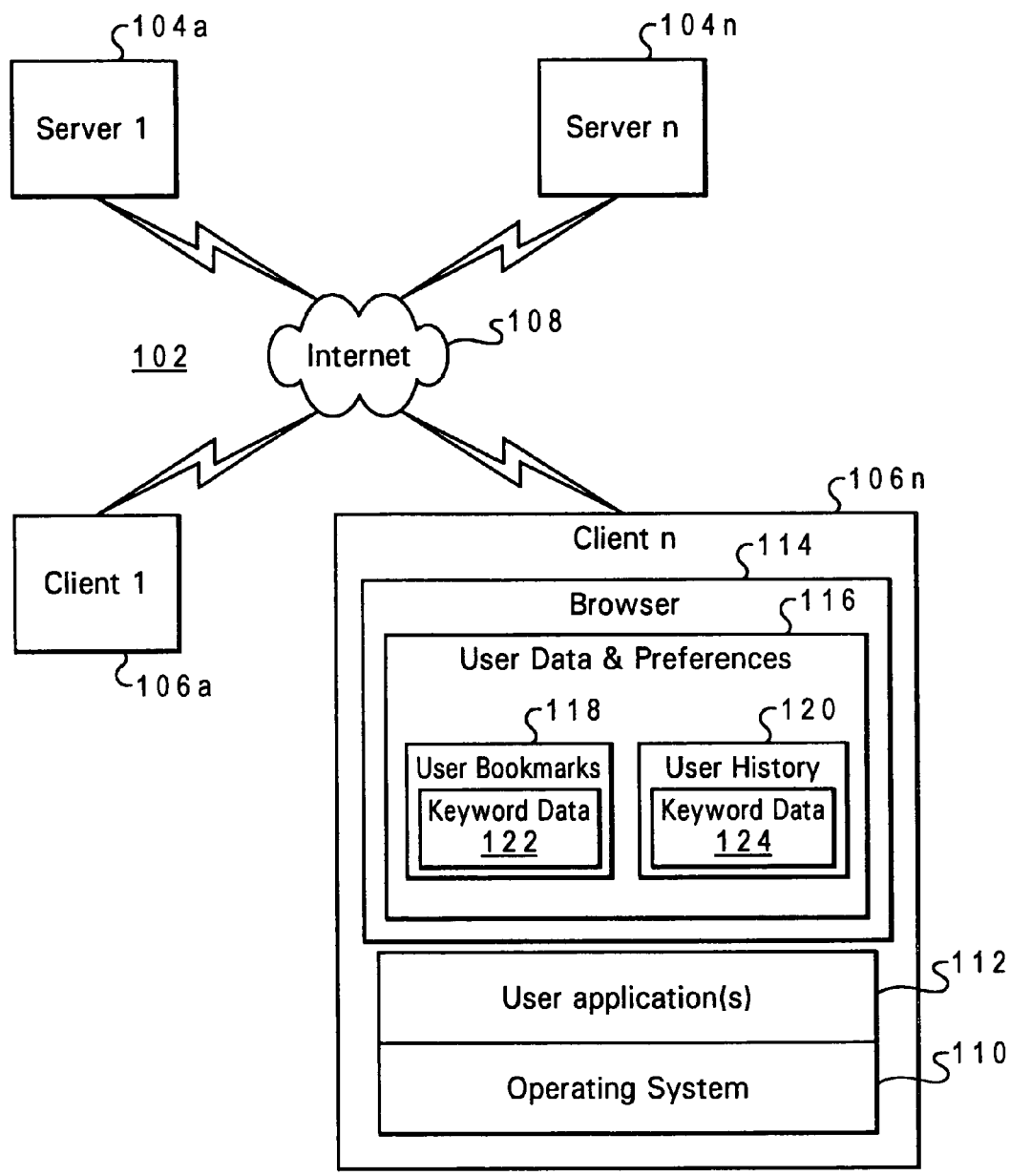
FIG. 1 depicts a data processing system network in which a preferred embodiment of the present invention is implemented.

With reference now to the figures, and in particular with reference to FIG. 1, a data processing system network, in which a preferred embodiment of the present invention is implemented is depicted. The data processing system network 102 includes a number of servers 104a–104n (where n is any positive integer) storing files including World Wide Web content. Servers 104a–104n are capable of selectively providing pages, typically HyperText Markup Language (HTML) documents and accompanying graphics, sound, or video files, in response to HyperText Transfer Protocol (HTTP) requests from clients 106a–106n coupled to servers 104a–104n via Internet 108.

As known in the art, content within servers 104a–104n is retrieved utilizing Uniform Resource Locators (URLs) providing an address mapping to the content. Each URL typically includes a resource identifier (e.g., "www"), a second level domain name (e.g., "ibm"), and a top level domain name (e.g., ".com"), and may optionally include a directory path and/or filename for the content being requested.

As known in the art and illustrated for client 106n, each individual client 106a–106n typically includes an operating system 110 facilitating the interaction between the system hardware and various software programs and one or more user applications 112, which may include all manner of network and non-network dependent applications ranging from spreadsheets to Internet telephony. In the present invention, one of the programs executing within the client 106n is a web browser 114 or similar data access and retrieval application.

The client 106n and browser 114 in the exemplary embodiment are intended for shared use by multiple users. Among other constituent parts, the web browser 114 will typically have a file and/or directory 116 for user data and preferences for a particular user, as well as a data structure 118 containing the user's bookmarks and a second data structure 120 containing the user's browsing history. In the present invention, both the bookmarks list 118 and the history list 120 contain keyword data 122 and 124, respectively, associated with URLs within the lists as described in further detail below. The term "hotlist" is employed herein to refer to any bookmarks, histories, or favorites lists, channels, or any other data structure containing a list of URLs pointing to selected content.

Referring now to FIGS. 2A and 2B, data structures for bookmarks and history lists in accordance with a preferred embodiment of the present invention are illustrated. FIG. 2A illustrates a bookmarks list 118, a listing of URLs which a user has selected for ready reference. Each entry within bookmarks list 118 includes a name 202 identifying generally the site which is linked (e.g., "IBM Home Page"), an URL 204 providing the link to the referenced content, an add date 206 identifying the data on which the corresponding bookmark was added to bookmarks list 118, and a last visited data 208 identifying the date on which the referenced content was last accessed by the user. Each entry also include a description 210 and keywords 122.

Description 210 is typically an intelligible statement regarding the content referenced or the nature of the enterprise which published the reference content. Description 210 is usually captured from the referenced content when a bookmark to the referenced content is created. For example, the IBM Home Page includes a "description" meta tag containing an intelligible statement regarding the nature of the page and the enterprise publishing page:

<meta name="DESCRIPTION" content="The IBM corporate home page, entry point to information about IBM products and services"/>

This description may be captured when the link is added to bookmarks list 118, and stored within description field 210 of the corresponding entry. Alternatively, the content of description field 210 may be manually entered by the user. Description 210 may be employed, for example, to provide a "flyover" pop-up description for the bookmark entry displayed whenever a pointer-driven cursor overlies a display region in which the bookmark entry is displayed.

Keywords 122 is a set of terms provided to identify the content of the corresponding bookmarks entry, generally in an arbitrary and unintelligible list of terms. As with description 210, keywords 122 may be captured from the meta tags of content referenced by a bookmark entry at the time the bookmark entry is created:

<meta name="KEYWORDS" value="IBM Microelectronics analog mixed signal asics ceramic probe cards communications networking ics digital video mpeg electronic card assembly test foundry services palette dacs ieee 1394 phy transceivers infrared technology memory mwave dsp packaging interconnect embedded controllers powerpc serial storage architecture x86 microprocessors" content=>

Such keywords are employed by Internet search engines to index sites, but are not captured within a field for a hotlist entry as proposed by the present invention.

Alternatively, keywords 122 may be subject to manual entry or editing by the user. Unscrupulous enterprises often misrepresent content in order to attract more "hits." For example, a site may include a reference to "sex" or the name of a competing enterprise within the keyword meta tag of the content published, in an effort to draw hits from keyword searches unrelated to or not intended to identify the corresponding site. For this reason, user editing capability over keywords 122 is preferred.

FIG. 2B illustrates a history list 120, a rolling list of the last n sites (where n is any positive integer) visited by the user or of sites visited by the user within the defined period (e.g., the last 30 days), which is automatically compiled by the browser. History list 120 also includes a name 212 and a corresponding URL 214 for each entry. In addition, each entry may include a first visited data 216 identifying the first time the user visited the corresponding site, a last visited date 218 identifying the most recent visitation by the user, and an expiration date 220 identifying a data on which the corresponding entry will be deleted, where aging is employed as part of the browsing history algorithm. Typically, history list 120 may be sorted for display utilizing any of the previously described fields within each entry.

History list 120 in the present invention includes keywords 124, an arbitrary (with respect to the rules of grammar) listing of terms defining the content referenced by the corresponding entry. As with keywords 122, keywords 124 may be automatically captured from the meta tags of the link content when the corresponding entry within history list 120 is created. Keywords 124 (and keywords 122) may be automatically updated whenever the linked site is revisited to reflect changes in the content published at the referenced URL.

In addition to capture from meta tags or manual user entry/editing, keywords 122 or 124 within a hotlist may be generated from the referenced content itself. The HTML text for the content may be processed to generate a list of terms which appears within the content, which may be filtered based on frequency of occurrence within the content, uniqueness, or any other criteria. The resulting terms may be employed in lieu of, or in addition to, any terms captured from the meta tags of the content or entered by the user within keywords 122 or 124.

Although only a bookmarks list and a history list are depicted in FIGS. 2A and 2B, keywords may be employed with any type of hotlist, and the techniques for selecting keywords may be employed regardless of the type of hotlist in which an entry is created.

Figure 3:
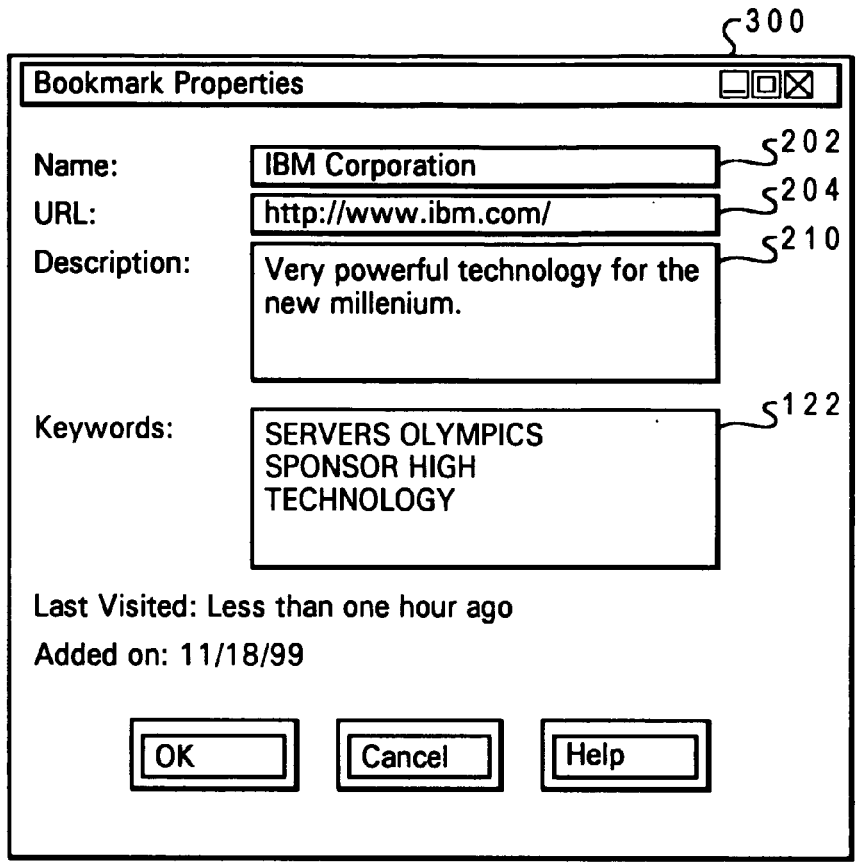
FIG. 3 depicts a mock-up of a user-interface for viewing and/or editing keywords associated with a hotlist entry in accordance with a preferred embodiment of the present invention.

With reference now to FIG. 3, a mock-up of a user-interface for viewing and/or editing keywords associated with a hotlist entry in accordance with a preferred embodiment of the present invention is depicted. The user interface dialog 300 is generated in response to a user selecting a hotlist entry and actuating an edit or "view properties" function. The hotlist entry being viewed and/or edited in the example shown is a bookmarks list entry. Accordingly, the name 202, URL 204, description 210 and keywords 122 are all displayed within the user dialog 300. All of the display fields for name 202, URL 204, description 210 and keywords 122 support editing capability, allowing the user to edit the contents of those display fields.

Figure 4A:
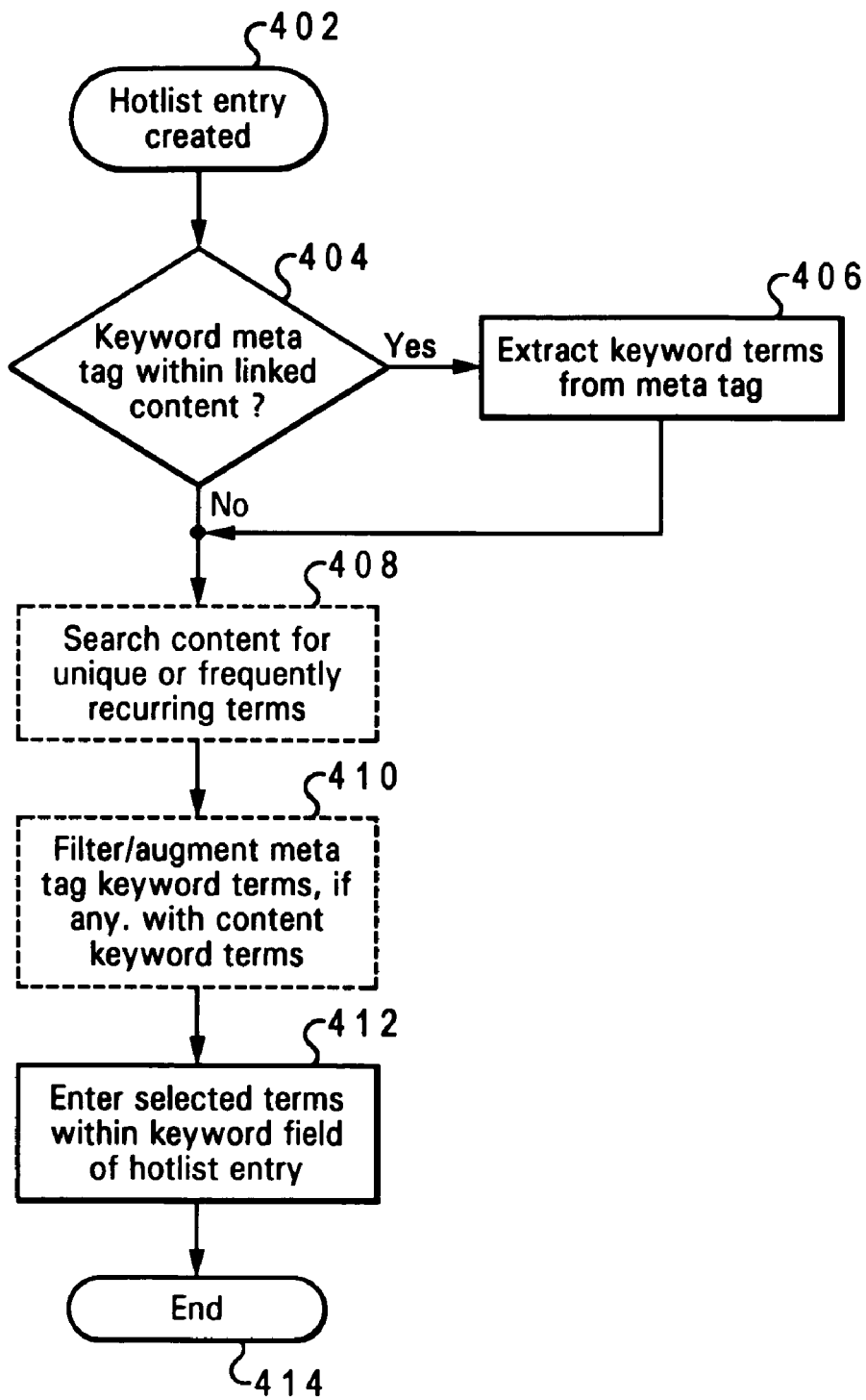
FIGS. 4A–4C are high-level flowcharts for processes of creating and maintaining hotlist entry keyword fields in accordance with a preferred embodiment of the present invention.
Figure 4B:
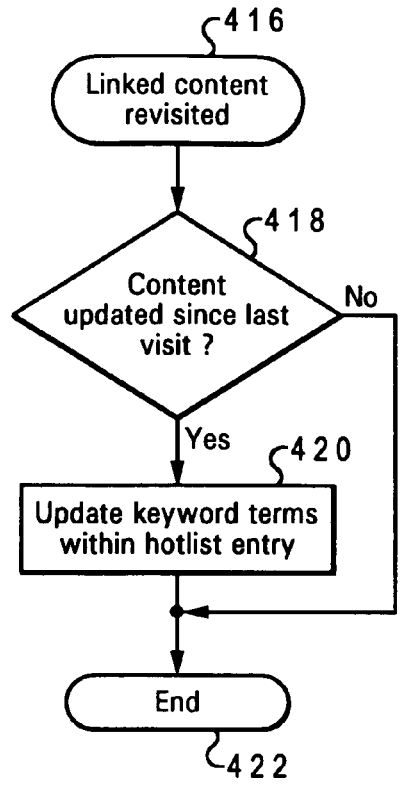
Figure 4C:
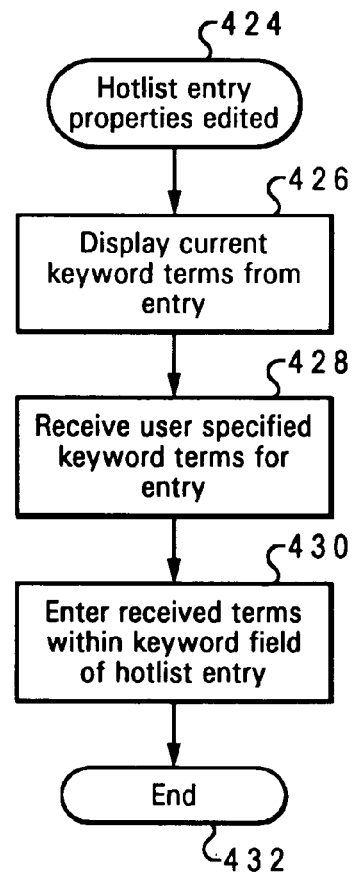

Referring now to FIGS. 4A through 4C, high level flow charts for processes of creating and maintaining hotlist entry keyword fields in accordance with a preferred embodiment of the present invention are illustrated. FIG. 4A illustrates the process of generating a keyword field for a newly created hotlist entry. The process begins at step 402, which depicts creation of a hotlist entry for content referenced by an URL. The process first passes to step 404, which illustrates, after retrieving the linked content, if necessary, a determining of whether the linked content contains a keyword meta tag.

While existing keyword meta tags may be employed, a novel HTML meta tag such as:

<meta name="HOTLISTKEYWORDS" value=".content==> may alternatively be employed. Such a meta tag would contain keywords specifically intended by the content publisher to be automatically extracted by a browser or similar HTML facility and included within a hotlist data structure to facilitate location of the desired link by the user at a later time.

If the linked content contains keyword meta tags, the process proceeds to step 406, which depicts extracting the keyword terms from the content meta tags. From step 406, or from step 404 if the linked content does not contain keyword meta tags, the process may optionally proceed to step 408, which illustrates scanning the linked content for unique or frequently recurring terms. A dictionary of "common" terms may be employed for this purpose, along with recurrence threshold(s). The content scanned may include meta data or only displayed contented, but should preferably include all content data so that images, sound files and motion picture files may also be indexed within the keywords by their name or description.

If step 408 is implemented, the process may then optionally pass to step 410, which depicts filtering and/or augmenting the meta tag keywords from the keyword meta tags (if any) utilizing the content keywords identified by scanning the content. In this manner, intentionally misleading or misdescriptive keywords included within the keyword meta tags by the publisher may be eliminated if the terms do not also appear within content itself. Alternatively, keywords for linked content may be synthesized from the content where no keyword meta tags are included within the published content, and meta tag keyword terms may be supplemented by content-derived terms.

The process then passes to step 412, which illustrates entering the selected keyword terms (meta tag keyword terms, content-derived keyword terms, or come combination thereof), if any, into the keyword field of the hotlist entry just created. The process then passes to step 414, which illustrates the process becoming idle until another hotlist entry is created.

FIG. 4B illustrates a process of automatically updating the keyword field of a hotlist entry. The browser or other HTML facility for which the hotlist is employed may allow the user to selectively designate the hotlist, or particular entries within the hotlist, for automatic updating whenever the content linked by a corresponding entry within the hotlist is revisited. The process begins at step 416, which illustrates the user revisiting content linked by an entry within the hotlist, the user may access the content through the hotlist entry, in which case triggering of the update process (e.g., as part of retrieval of the content) is straightforward. Alternatively, the user may access the content by manual entry of the URL or from a link within other content. In this latter instance, the URL of the content accessed must be compared to each of the URLs within the hotlist entries in order to determine whether the update process should be triggered.

The process first passes to step 418, which illustrates a determination of whether the linked content has been modified since the last access of the content by the user. This may be determined from comparison of a "last visited" field within the hotlist entry with an update meta tag within the linked content, such as:

<meta name="LASTUPDATE" value="Tue Apr 25 18:43:34 2000"!>

The need for a keyword update for the linked content may be presumed if the content has been updated since it was last accessed by the user. Alternatively, each entry within the hotlist may include a field in which the last update for the linked content, as last accessed by the user, is maintained.

If the content has been updated since the user's last visit, or the need for a keyword update for the hotlist entry is otherwise determined to exist, the process proceeds to step 420, which depicts updating the keywords for the hotlist entry. Any or all of steps 404 through 412 from FIG. 4A may be employed for this purpose. It should be noted that the keyword field within a hotlist entry may optionally be segregated into "fixed" keywords for the content, selected by the user and not updated with each visit, and "dynamic" keywords which are updated (and deleted or overwritten, if necessary) whenever the linked content is found to have changed. From step 420, or from step 418 if the linked content is unchanged since last accessed by the user, the process proceeds to step 422, which illustrates the process becoming idle until another site linked by a hotlist entry is accessed by the user.

FIG. 4C illustrates the process of updating keyword data based on manual editing by the user. The process begins at step 424, which depicts the properties of a hotlist entry being edited by the user. The process first passes to step 426, which illustrates displaying the current keyword terms from the selected hotlist entry to the user, and then to step 428, which depicts receiving user specified keyword terms (e.g., an edited list from the display) for the entry. The process then passes to step 430, which illustrates entering the received keyword terms within the keyword filed of the hotlist entry being edited, and then to step 432, which illustrates the process becoming idle until another hotlist entry is edited by the user.

Figure 5:
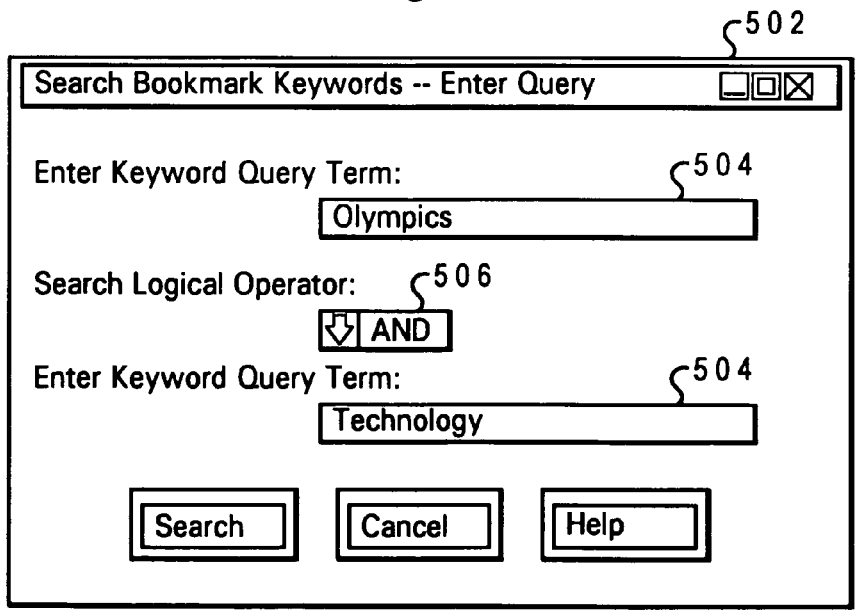
FIG. 5 depicts a mock-up of a user interface dialog enabling search of hotlist entries utilizing content-identifying keywords in accordance with a preferred embodiment of the present invention.

With reference now to FIG. 5, a mock-up of a user interface dialog enabling search of hotlist entries utilizing content-identifying keywords in accordance with a preferred embodiment of the present invention is depicted. Dialog 502 allows the user to search the keyword substructures of a hotlist for selected search terms. Dialog 502 allows the user to enter one or more search term(s) within the primary keyword query term input-boxes 504, and to select logical operators using a logical operator blank 506 for logical linking of terms submitted in the keyword query. Any number of keyword term input-box 504 and logical operator input-boxes 506 may be provided to the user, and the number of provided keyword term input-boxes 504 and logical operator input-boxes 506 may be expanded when those provided are all utilized.

Upon actuation of the "Search" user control, a search engine (not shown) then searches the keyword data stored in the keyword section of the hotlist data structure. The user will typically be able to include, in addition to the search term or search terms, a series of logical operators that specify how the terms can be combined, for instance, the user will typically be able to combine search terms with a 'logical and' operator when more than one term needs to be present to indicate a valid search result. The user will typically also be able to combine search terms with a 'logical or' operator when one term out of several possible search terms needs to be present to indicate a valid search result. The user will typically also be able to combine search terms with a 'logical except' operator when the presence of some search terms must accompany the absence of other terms in order to indicate a valid search result. Other logical search terms may be available and will fall within the scope of the present invention.

Figure 6:
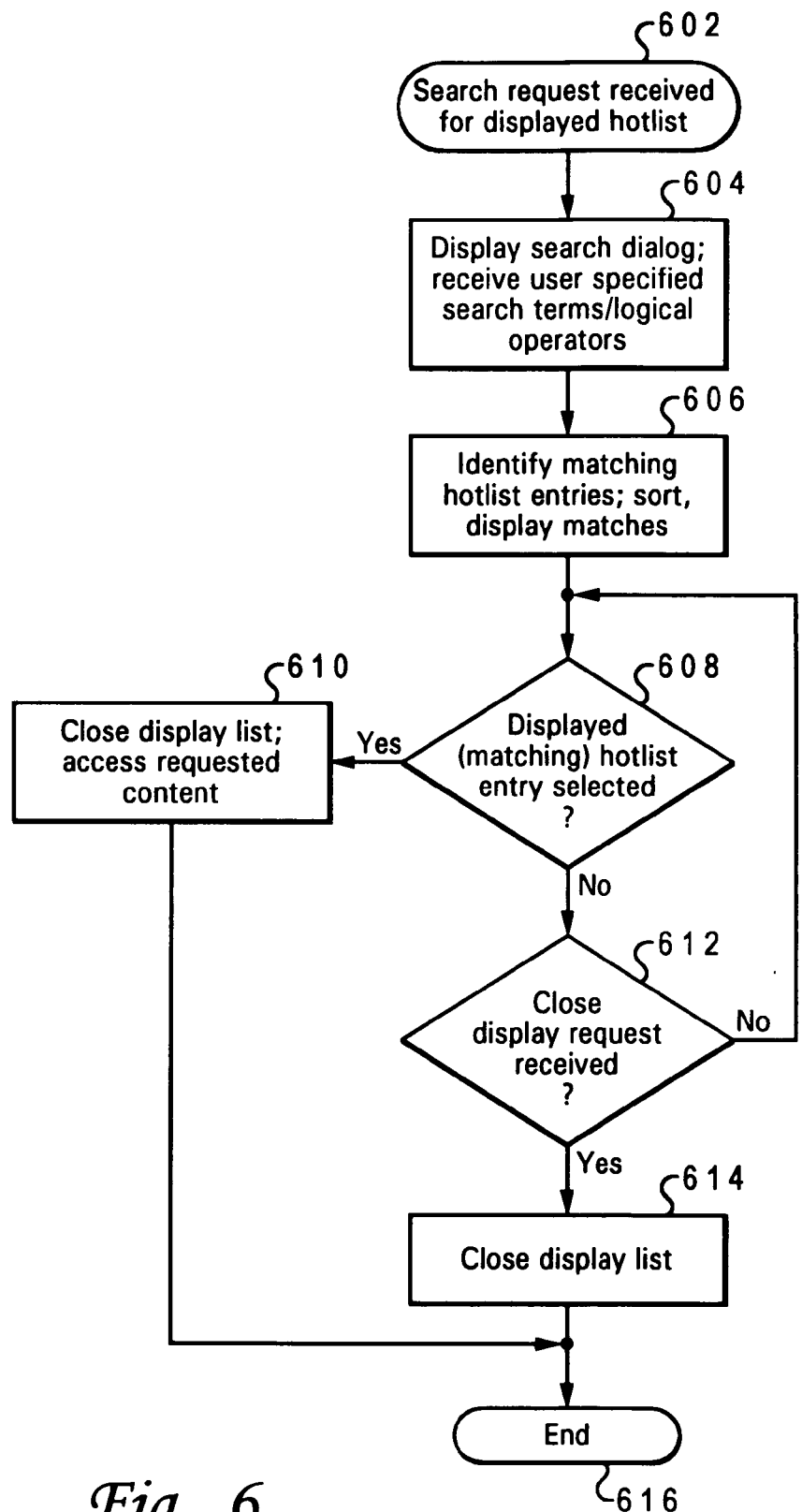
FIG. 6 is a high-level flowchart for a process of searching, retrieving, and displaying hotlist entries based on keyword data within the hotlist entries in accordance with the preferred embodiment of the present invention.

Referring to FIG. 6, a high-level flowchart for a process of searching, retrieving, and displaying hotlist entries based on keyword data within the hotlist entries in accordance with the preferred embodiment of the present invention is illustrated. The process begins at step 602, which depicts receipt of a hotlist entry search request. The process first passes to step 604, which illustrates displaying the search dialog to the user and receiving the search term(s) and logical operators (if any) from the user through the dialog.

The process passes next to step 606, which depicts identifying matching hotlist entries by comparing the logical search criteria to keyword terms associated with each hotlist entry and determining while hotlist entries, if any satisfy the search criteria. The hotlist entries which are identified as satisfying the search criteria are then sorted and displayed. The process next passes to step 608, which illustrates a determination of whether a displayed hotlist entry (which satisfies the specified search criteria) has been selected by the user. If so, the process proceeds to step 610, which depicts closing (or minimizing) the display and accessing the requested content utilizing the URL within the hotlist entry selected by the user.

If the user does not select a displayed hotlist entry, the process proceeds instead to step 612, which illustrates a determination of whether a request to close the display has been received (for example, by the user actuating a display control). If not, the process returns to step 608 to continue polling for selection of a displayed hotlist by the user. If so, however, the process proceeds instead to step 614, which depicts closing the display of hotlist entries which satisfy the search criteria, and then to step 616, which illustrates the process becoming idle until another hotlist entry keyword search is received.

The present invention provides an improved system of storage and retrieval for bookmarks in computerized information systems and grants the ability to locate relevant bookmarks based on the content or implications of the file represented by the bookmark. Still more particularly, the present invention displays of bookmarks related to a particular search term by use of a keyword data structure and a search and retrieval engine. It also provides a particularly distinctive facility for automatically extracting keyword data from the content of the web page and placing it in the bookmark file for later search.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of improving the search for and retrieval of pages from a hotlist of pages, said method comprising:
    a browser client creating an entry representing a page in a hotlist of pages in response to a user designating a page as a page of interest by requesting said creation of said entry in said hotlist of pages;
    the browser client searching the page for keywords, wherein the step of searching the page for keywords further comprises the browser client performing one of a set consisting of discovering at least one keyword within the page and, responsive to discovering an absence of keywords within metadata for the page, automatically generating a group of keywords based on the content of the page; and
    the browser client, responsive to one of the set of discovering at least one keyword within the page and automatically generating said group of keywords, incorporating one of the set of the at least one keyword and said group of keywords into a keyword field of the entry in the hotlist of pages.

2. The method of claim 1, further comprising:
   in response to a user input requesting a search, searching for at least one selected search term in keyword fields of one or more entries in the hotlist of pages;
   displaying to the user one or more entries in the hotlist of pages containing the selected search term within a keyword field for the respective entry; and
   responsive to an input from the user selecting a displayed entry, retrieving a page associated with the selected displayed entry in the hotlist of pages.

3. A method of improving the search for and retrieval of pages from a hotlist of pages, said method comprising:
   a browser client creating an entry representing a page in a hotlist of pages in response to a user designating a page as a page of interest;
   the browser client searching the page for keywords, wherein the step of searching the page for keywords further comprises the browser client performing one of a set consisting of discovering at least one keyword within the page and, responsive to discovering an absence of keywords within metadata for the page, automatically generating a group of keywords based on the content of the page; and
   the browser client, responsive to discovering at least one keyword within the page, incorporating the at least one keyword into a keyword field of the entry in the hotlist of pages, wherein the step of incorporating the at least one keyword into a keyword field of the entry in the hotlist of pages further comprises
   allowing the user to edit the keyword field of the entry in the hotlist of pages.

4. A method of improving the search for and retrieval of pages from a hotlist of pages, said method comprising
   a browser client creating an entry representing a page in a hotlist of pages in response to a user designating a page as a page of interest;
   the browser client searching the page for keywords, wherein the step of searching the page for keywords further comprises the browser client performing one of a set consisting of discovering at least one keyword within the page and, responsive to discovering an absence of keywords within metadata for the page, automatically generating a group of keywords based on the content of the page; and
   the browser client, responsive to discovering at least one keyword within the page, incorporating the at least one keyword into a keyword field of the entry in the hotlist of pages, wherein the step of incorporating the at least one keyword into a keyword field of the entry in the hotlist of pages further comprises allowing the user to selectively enable automatic updates of the keyword field of an entry in the hotlist of pages whenever the page represented by the entry is accessed.

5. A system for improving the search for and retrieval of pages from a hotlist of pages, said system comprising:
   means, within a browser client, for creating an entry representing a page in a hotlist of pages in response to a user designating a page as a page of interest;
   means, within the browser client, for searching the page for keywords, wherein the means for searching the page for keywords further comprises means for the browser client performing one of a set consisting of discovering at least one keyword within the page and, responsive to discovering an absence of keywords within metadata for the page, automatically generating a group of keywords based on the content of the page; and
   means for the browser client, responsive to one of the set of discovering at least one keyword within the page and automatically generating said group of keywords, incorporating one of the set of the at least one keyword and said group of keywords into a keyword field of the entry in the hotlist of pages.

6. The system of claim 5, further comprising:
   means for, in response to a user input requesting a search, searching for at least one selected search term in keyword fields of one or more entries in the hotlist of pages;
   means for displaying to the user one or more entries in the hotlist of pages containing the selected search term within a keyword field for the respective entry; and
   means, responsive to an input from the user selecting a displayed entry, for retrieving a page associated with the selected displayed entry in the hotlist of pages.

7. A system for improving the search for and retrieval of pages from a hotlist of pages, said system comprising:
   means, within a browser client, for creating an entry representing a page in a hotlist of pages in response to a user designating a page as a page of interest;
   means, within the browser client, for searching the page for keywords, wherein the means for searching the page for keywords further comprises means within the browser client for performing one of a set consisting of discovering at least one keyword within the page and, responsive to discovering an absence of keywords within metadata for the page, automatically generating a group of keywords based on the content of the page; and
   means, within the browser client, for, responsive to discovering at least one keyword within the page, incorporating the at least one keyword into a keyword field of the entry in the hotlist of pages, wherein the means for incorporating the at least one keyword into a keyword field of the entry in the hotlist of pages further comprises means for allowing the user to edit the keyword field of the entry in the hotlist of pages.

8. A system for improving the search for and retrieval of pages from a hotlist of pages, said system comprising:
   means, within a browser client, for creating an entry representing a page in a hotlist of pages in response to a user designating a page as a page of interest;
   means, within the browser client, for searching the page for keywords, wherein the means for searching the page for keywords further comprises means for performing one of a set consisting of discovering at least one keyword within the page and, responsive to discovering an absence of keywords within metadata for the page, automatically generating a group of keywords based on the content of the page; and
   means, within the browser client, responsive to discovering at least one keyword within the page, for incorporating the at least one keyword into a keyword field of the entry in the hotlist of pages, wherein the means for incorporating the at least one keyword into a keyword field of the entry in the hotlist of pages further comprises means for allowing the user to selectively enable automatic updates of the keyword field of an entry in the hotlist of pages whenever the page represented by the entry is accessed.

9. A tangible computer usable medium storing thereon a computer program product for improving the search for and retrieval of pages from a hotlist of pages, said computer program product, when executed by the computer, causing the computer to perform a method comprising the steps of:

within a browser client, creating an entry representing a page in a hotlist of pages in response to a user designating a page as a page of interest;

within a browser client, searching the page for keywords, wherein the instructions for searching the page for keywords further comprise instructions for the browser client performing one of a set consisting of discovering at least one keyword within the page and, responsive to discovering an absence of keywords within metadata for the page, automatically generating a set of keywords based on the content of the page; and within a browser client, responsive to discovering at least one keyword within the page, incorporating the at least one keyword into a keyword field of the entry in the hotlist of pages.

10. The tangible computer usable medium storing thereon a computer program product of claim 9, said method further comprising the steps of:

in response to a user input requesting a search, searching for at least one selected search term in keyword fields of one or more entries in the hotlist of pages;

displaying to the user one or more entries in the hotlist of pages containing the selected search term within a keyword field for the respective entry; and responsive to an input from the user selecting a displayed entry, retrieving a page associated with the selected displayed entry in the hotlist of pages.

11. A tangible computer usable medium storing thereon a computer program product for improving the search for and retrieval of pages from a hotlist of pages, said computer program product, when executed by the computer, causing the computer to perform a method comprising the steps of:

within a browser client, creating an entry representing a page in a hotlist of pages in response to a user designating a page as a page of interest;

within a browser client, searching the page for keywords, wherein the step of searching the page for keywords further comprises the browser client performing one of a set consisting of discovering at least one keyword within the page and, responsive to discovering an absence of keywords within metadata for the page, automatically generating a group of keywords based on the content of the page;

within a browser client, responsive to discovering at least one keyword within the page, incorporating the at lest one keyword into a keyword field of the entry in the hotlist of pages, wherein the instructions for incorporating the at least one keyword into a keyword field of the entry in the hotlist of pages further comprise instructions for allowing the user to edit the keyword field of the entry in the hotlist of pages.

12. A tangible computer usable medium storing thereon a computer program product for improving the search for and retrieval of pages from a hotlist of pages, said computer program product, when executed by the computer, causing the computer to perform a method comprising the steps of:

within a browser client, creating an entry representing a page in a hotlist of pages in response to a user designating a page as a page of interest;

within a browser client, searching the page for keywords, wherein the step of searching the page for keywords further comprises the browser client performing one of a set consisting of discovering at least one keyword within the page and, responsive to discovering an absence of keywords within metadata for the page, automatically generating a group of keywords based on the content of the page;

within a browser client, responsive to discovering at least one keyword within the page, incorporating the at least one keyword into a keyword field of the entry in the hotlist of pages, wherein the instructions for incorporating the at least one keyword into a keyword field of the entry in the hotlist of pages further comprise instructions for allowing the user to selectively enable automatic updates of the keyword field of an entry in the hotlist of pages whenever the page represented by the entry is accessed.

* * * * *